(12) United States Patent
Lange et al.

(10) Patent No.: US 7,707,277 B2
(45) Date of Patent: Apr. 27, 2010

(54) METHOD AND SYSTEM FOR CONFIGURING PSEUDOWIRES USING DYNAMIC HOST CONFIGURATION PROTOCOL (DHCP) MESSAGES

(75) Inventors: Andrew Snowden Lange, Culver City, CA (US); Wim Henderickx, Westerlo (BE)

(73) Assignee: Alcatel Lucent, Paris (FR)

( * ) Notice: Subject to any disclaimer, the term of this patent is extended or adjusted under 35 U.S.C. 154(b) by 357 days.

(21) Appl. No.: 11/741,678

(22) Filed: Apr. 27, 2007

(65) Prior Publication Data
US 2008/0270580 A1 Oct. 30, 2008

(51) Int. Cl.
*G06F 15/177* (2006.01)
(52) U.S. Cl. ...................... 709/220; 709/238
(58) Field of Classification Search .......... 370/392, 370/396, 437, 389; 709/238
See application file for complete search history.

(56) References Cited

U.S. PATENT DOCUMENTS

| | | | | |
|---|---|---|---|---|
| 6,009,103 | A * | 12/1999 | Woundy | 370/401 |
| 6,028,848 | A * | 2/2000 | Bhatia et al. | 370/257 |
| 6,687,245 | B2 * | 2/2004 | Fangman et al. | 370/356 |
| 6,697,360 | B1 * | 2/2004 | Gai et al. | 370/389 |
| 7,023,878 | B2 * | 4/2006 | Ho | 370/465 |
| 7,286,539 | B2 * | 10/2007 | Tsuge et al. | 370/392 |
| 7,385,966 | B2 * | 6/2008 | Monteiro et al. | 370/356 |
| 7,483,387 | B2 * | 1/2009 | Guichard et al. | 370/252 |
| 7,558,194 | B2 * | 7/2009 | Regan et al. | 370/217 |
| 2004/0052216 | A1 * | 3/2004 | Roh | 370/252 |
| 2006/0133405 | A1 * | 6/2006 | Fee | 370/437 |
| 2007/0237148 | A1 * | 10/2007 | Jabr et al. | 370/392 |
| 2007/0248085 | A1 * | 10/2007 | Volpano | 370/389 |
| 2007/0268917 | A1 * | 11/2007 | Wong et al. | 370/401 |
| 2008/0109559 | A1 * | 5/2008 | Chhabra et al. | 709/238 |
| 2008/0165781 | A1 * | 7/2008 | Voit et al. | 370/392 |
| 2008/0198858 | A1 * | 8/2008 | Townsley et al. | 370/401 |
| 2008/0253381 | A1 * | 10/2008 | Ward et al. | 370/396 |
| 2009/0240792 | A1 * | 9/2009 | Ren | 709/221 |

OTHER PUBLICATIONS

Droms, R., "Dynamic Host Configuraiton Protocol", IETF RFC 2131, Mar. 1997.
T'Joens "DHCP reconfigure extension", IETF RFC 3203, Dec. 2001.

* cited by examiner

*Primary Examiner*—Thong H Vu
(74) *Attorney, Agent, or Firm*—Wilson & Ham Patent Attorneys (57) ABSTRACT

A technique for configuring a pseudowire involves extending the functionality of the Dynamic Host Configuration Protocol (DHCP). In an embodiment, pseudowire configuration information is embedded into DHCP messages that are communicated between a customer edge (CE) device and a provider edge (PE) device and used to configure a pseudowire between the two devices. The pseudowire configuration information may include an indication of the pseudowire capabilities of the CE device, the types of pseudowires desired by the CE device, the types of pseudowire encapsulations supported by the CE device, the types of pseudowires that are to be configured, the pseudowire encapsulations that are to be used, and pseudowire labels. Pseudowire configuration information can be embedded into the options field of a DHCP message using a new option, using multiple new options, or by overloading an existing option.

23 Claims, 7 Drawing Sheets

| op (1) | htype (1) | hlen (1) | hops (1) |
|---|---|---|---|
| xid (4) ||||
| secs (2) || flags (2) ||
| ciaddr (4) ||||
| yiaddr (4) ||||
| siaddr (4) ||||
| giaddr (4) ||||
| chaddr (16) ||||
| sname (64) ||||
| file (128) ||||
| options (312) ||||

METHOD AND SYSTEM FOR CONFIGURING PSEUDOWIRES USING DYNAMIC HOST CONFIGURATION PROTOCOL (DHCP) MESSAGES

FIELD OF THE INVENTION

The invention relates generally to network management, and more particularly, to configuring pseudowires in a packet switched network.

BACKGROUND OF THE INVENTION

Network service providers have begun using pseudowires to provide advanced network services to customers. In general, a pseudowire is a term for a service that emulates a native service over a packet switched network such as an IP network, an MPLS network, or a Layer Two Tunneling Protocol (L2TP) network. Native services that are typically emulated via a pseudowire include ATM, Frame Relay, Ethernet, TDM, and SONET/SDH. In one key application, pseudowires allow different types of legacy services to be seamlessly provided across a single packet network. Pseudowires are commonly used within a service provider network to communicate legacy traffic between service provider edge devices. More recently, pseudowires are being used to connect customer edge devices and service provider edge devices. For example, a customer edge device such as a cellular network end station (e.g., a 3G Base Transceiver Station (BTS) or NodeB) may utilize a few pseudowires to emulate TDM, ATM, and/or Ethernet services between the customer edge device and a service provider edge device.

The implementation of a pseudowire typically involves establishing label switched paths (LSPs) or tunnels that are identified by a unique identifier, commonly referred to as a label. In order to establish a pseudowire between two network nodes, pseudowire configuration information, including label numbers, must be communicated between the nodes. Conventional protocols used to configure pseudowires include the Label Distribution Protocol (LDP) and the Resource Reservation Protocol (RSVP). LDP and RSVP are resilient protocols that utilize the Transmission Control Protocol (TCP) at the Transport Layer to ensure reliability of message transmission. Although LDP and RSVP work well to enable the configuration of pseudowires, implementing these protocols is resource intensive. For example, the use of TCP requires that state information be maintained for each LDP session that is established.

The resource requirements of pseudowire configuration are not a significant concern to service providers when the number of pseudowires is small. However, the use of pseudowires to connect customer edge devices to service provider edge devices is causing more and more demand for pseudowires. As the demand for pseudowires increases, the resource requirements for pseudowire configuration can become a significant drain on network resources. In view of this, there is a need for an efficient and scalable way to configure pseudowires, especially between customer edge devices and service provider edge devices.

SUMMARY OF THE INVENTION

A technique for configuring a pseudowire involves extending the functionality of Dynamic Host Configuration Protocol (DHCP). The technique is particularly applicable to configuration of pseudowires between customer edge (CE) devices and service provider edge (PE) devices in cases where the CE devices need only a few pseudowires and where the pseudowires do not change very often. In an embodiment, pseudowire configuration information is embedded into DHCP messages that are communicated between a CE device and a PE device. The pseudowire configuration information may include an indication of the pseudowire capabilities of the CE device, the types of pseudowires desired by the CE device, the types of pseudowire encapsulations supported by the CE device, the types of pseudowires that are to be configured, the pseudowire encapsulations that are to be used, and pseudowire labels. The pseudowire configuration information that is communicated between a CE device and a PE device within DHCP messages is used to configure a pseudowire between the CE device and the PE device. Because DHCP utilizes UDP instead of TCP at the Transport Layer to communicate protocol messages, pseudowire configuration can be accomplished without having to maintain TCP state information. The benefits of configuring pseudowires without having to maintain TCP state information for each pseudowire configuration are realized as the number of pseudowires increases. Additionally, because the technique for configuring pseudowires utilizes a protocol that is already widely known and accepted, the technique does not require the development and acceptance of an entirely new protocol.

In accordance with an embodiment of the invention, the pseudowire configuration information is embedded into the options field of a DHCP message. In one embodiment, a new option is established for the communication of pseudowire configuration information. In an alternative embodiment, multiple new options are established to carry different types of pseudowire configuration information. In another alternative embodiment, pseudowire configuration information is embedded into DHCP messages by adding the pseudowire configuration information to data carried in an existing option. Pseudowire configuration information can be added to an existing option by, for example, "option overloading."

In an embodiment, a method for configuring a pseudowire involves generating a DHCP message, embedding pseudowire configuration information into the DHCP message, communicating the DHCP message between two network nodes, and configuring a pseudowire between the two network nodes in response to the pseudowire configuration information that is embedded into the DHCP message.

In another embodiment, a method for configuring a pseudowire involves generating a DHCPDISCOVER message, embedding first pseudowire configuration information into the DHCPDISCOVER message, communicating the DHCPDISCOVER message from a first network node to a second network node, generating a DHCPOFFER message in response to the DHCPDISCOVER message, embedding second pseudowire configuration information into the DHCPOFFER message, communicating the DHCPOFFER message from the second network node to the first network node, generating a DHCPREQUEST message in response to the DHCPOFFER message, embedding third pseudowire configuration information into the DHCPREQUEST message, communicating the DHCPREQUEST message from the first network node to the second network node, generating a DHCPACK message in response to the DHCPREQUEST message, embedding fourth pseudowire configuration information into the DHCPACK message, communicating the DHCPACK message from the second network node to the first network node, and configuring a pseudowire between the first and second network nodes in response to the first, second, third, and fourth pseudowire configuration information.

A network device that is capable of supporting a pseudowire between the network device and another network device includes a DHCP module configured to generate DHCP messages and a pseudowire configuration module configured to embed first pseudowire configuration information into a DHCP message that is generated by the DHCP module and to configure a pseudowire between the network device and another network device in response to second pseudowire configuration information that is extracted from a DHCP message received by the DHCP module.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION

Figure 1:
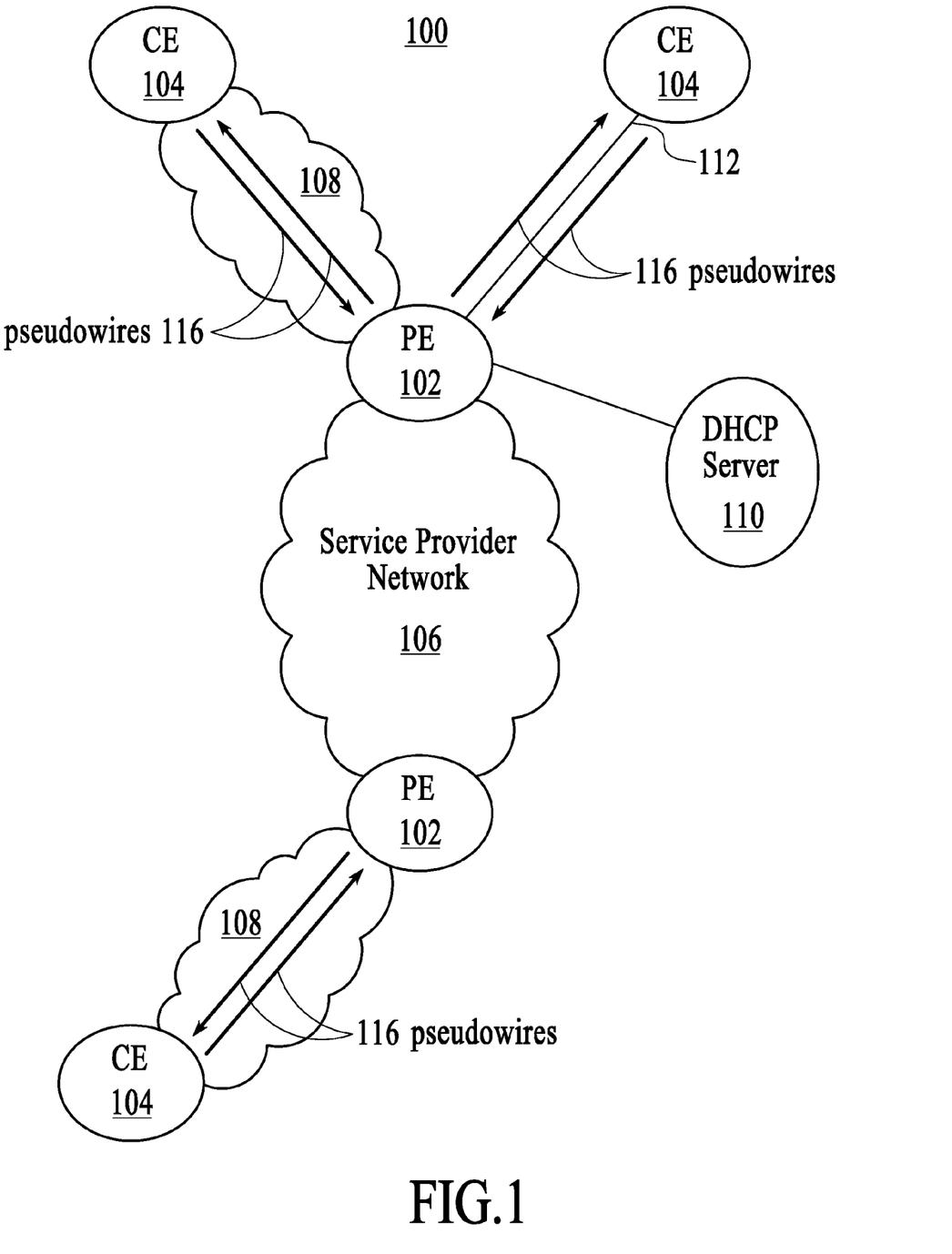
FIG. 1 depicts a network that includes service provider edge (PE) devices, customer edge (CE) devices, a service provider network, a local network, and a Dynamic Host Configuration Protocol (DHCP) server.

FIG. 1 depicts a network 100 that includes service provider edge (PE) devices 102, customer edge (CE) devices 104, a service provider network 106, a local network 108, and a Dynamic Host Configuration Protocol (DHCP) server 110. The PE devices are network devices that support packet switching and/or routing and are located at the edge of the service provider network. In an embodiment, a PE device may terminate, aggregate, and/or cross-connect pseudowires. Further, each PE device is a DHCP-enabled device that acts as a DHCP relay or proxy. DHCP is described in more detail below.

The service provider network 106 is a network that supports communications between the PE devices 102. In an embodiment, the service provider network is an IP/MPLS network that supports pseudowire emulation edge-to-edge (PWE3). Although the service provider network is an IP/MPLS network in the embodiment of FIG. 1, the service provider network may utilize other packet switching network protocols.

The CE devices 104 are network devices that interface with the PE devices 102. The CE devices can be connected to a PE device by a direct connection 112 or through a local network 108 that includes intermediate network nodes (not shown). The local network may include, for example, Layer Two (i.e., Data Link Layer) network switches. In the embodiment of FIG. 1, the CE devices support pseudowires 116 between the CE devices and the PE devices. For example, the CE devices and the PE devices support pseudowires implemented as unidirectional label switched paths (LSPs). The CE devices are also DHCP-enabled devices. In particular, the CE devices are able to act in the client role as designated in DHCP. In the embodiment of FIG. 1, the CE devices are end station devices such as cellular network end stations (e.g., 3G Base Transceiver Stations (BTS) or NodeB), cell site aggregators/routers, or MPLS-based multi-tenant unit MTU/single-tenant unit (STU) devices. However, in other embodiments, a CE device can be an intermediate network node such as an aggregation node, a switch, and/or a router.

In the embodiment of FIG. 1, the DHCP server 110 acts in the server role as designated in DHCP and the PE devices 102 act as DHCP relays. In an alternative embodiment, the PE devices act as DHCP proxies, performing the functions of the DHCP server. As is well-known in the field of IP networking, DHCP is a set of rules that manages the allocation of IP addresses within a network. According to the protocol, the DHCP client requests an IP address and the DHCP server assigns an IP address and ensures that the assigned IP address is unique within the network. DHCP utilizes a specific set of messages and a specific message protocol to manage IP address allocation. The details of DHCP are described in the IETF document entitled "Dynamic Host Control Protocol," RFC 2131, March 1997, which is incorporated by reference herein.

According to the DHCP protocol, to start the IP address allocation process, a client generates a DHCPDISCOVER message, which is a broadcast message that indicates the client's desire for an IP address. In response, the server generates a DHCPOFFER message, which is a unicast message that indicates the configuration parameters that are being offered by the DHCP server, e.g., the IP address, the duration that the IP address is valid (referred to as the lease duration), and the IP address of the server that is making the offer. In response to the DHCPOFFER message or multiple DHCPOFFER messages if more than one DHCP server responds to the DHCPDISCOVER message, the client generates a DHCPREQUEST message, which is a broadcast message that contains the IP address of the DHCP server that provided the accepted offer. In response to the DHCPREQUEST message, the selected DHCP server generates a DHCPACK message, which is a unicast message that indicates the final configuration parameters for the client. As defined in DHCP, all DHCP messages use User Datagram Protocol (UDP) (e.g., ports 67 and 68) at the Transport Layer. As is known in the field, UDP is a Transport Layer protocol that does not require state information to be maintained.

As depicted in the embodiment of FIG. 1, pseudowires 116 exist between the CE devices 104 and the PE devices 102. These pseudowires can be configured using conventional techniques such as LDP/RSVP. However, the use of LDP/RSVP to configure pseudowires can put a strain on network resources, especially as demand for pseudowires increases.

In accordance with an embodiment of the invention, the functionality of DHCP is extended to support the configuration of pseudowires, particularly for the configuration of pseudowires between CE devices and PE devices in cases where the CE devices need only a few pseudowires and where the pseudowires do not change very often. In an embodiment, pseudowire configuration information is embedded into DHCP messages that are communicated between a CE device and a PE device. The pseudowire configuration information may include an indication of the pseudowire capabilities of the CE device, the types of pseudowires desired by the CE device, the types of pseudowire encapsulations supported by the CE device, the types of pseudowires that are to be configured, the pseudowire encapsulations that are to be used, and pseudowire labels. The pseudowire configuration information that is communicated between a CE device and a PE device within DHCP messages is used to configure a pseudowire between the CE device and the PE device. Because DHCP utilizes UDP instead of TCP at the Transport Layer to communicate protocol messages, pseudowire configuration can be accomplished without having to maintain TCP state information. The benefits of configuring pseudowires without having to maintain TCP state information for each pseudowire configuration are realized as the number of pseudowires increases. Additionally, because the technique for configuring pseudowires utilizes a protocol that is already widely known and accepted, the technique does not require the development and acceptance of an entirely new protocol. A more detailed description of a technique for configuring pseudowires using DHCP messages is described below with reference to FIGS. 2-4.

Figure 2:
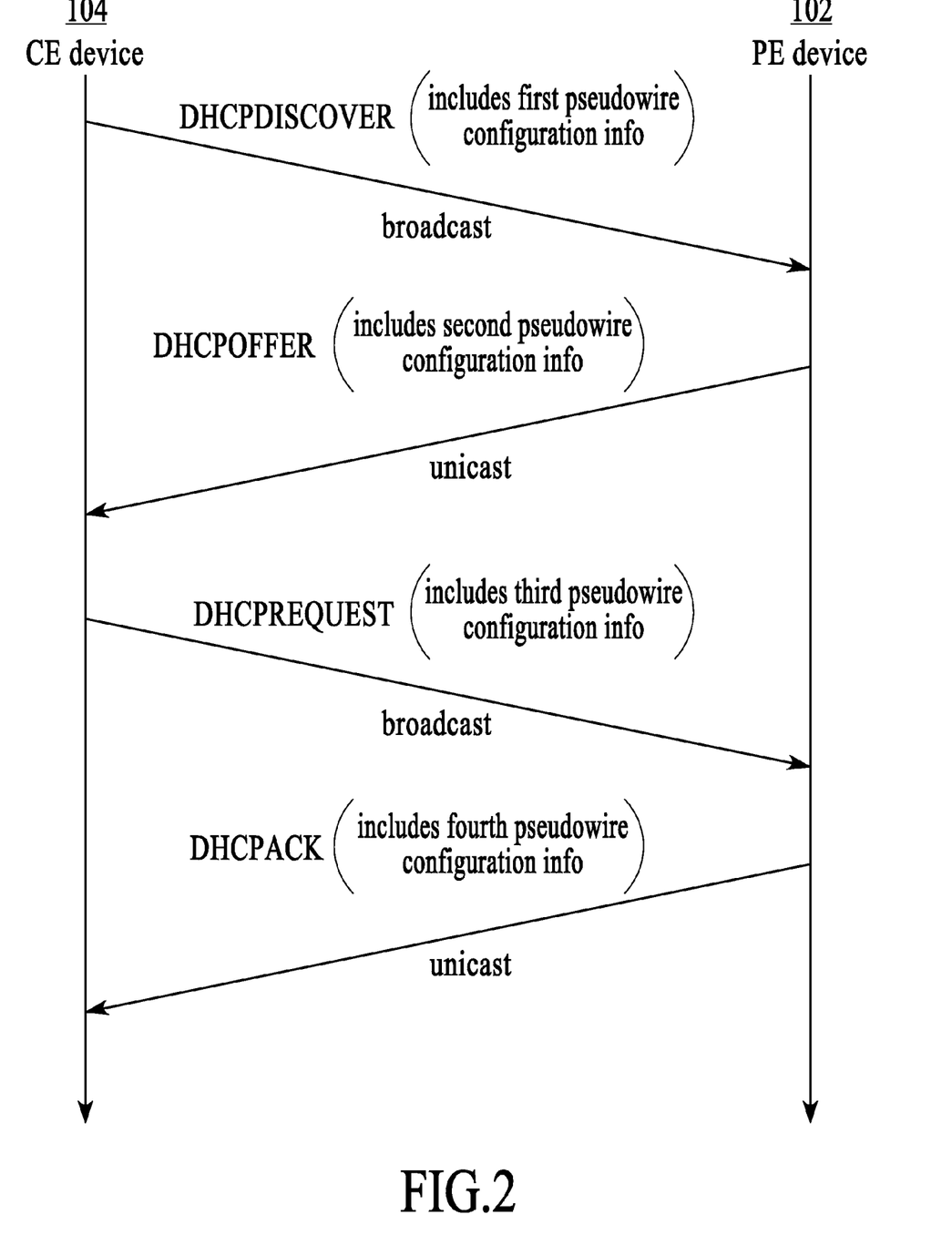
FIG. 2 illustrates DHCP message exchanges in a technique for configuring a pseudowire that utilizes the DHCP protocol.

FIG. 2 illustrates a technique for configuring a pseudowire that utilizes the DHCP protocol. Referring to FIG. 2, arrows pointing from left to right indicate DHCP messages that are communicated from a CE device to a PE device and arrows pointing from right to left indicate DHCP messages that are communicated from the PE device to the CE device. In the embodiment of FIG. 2, the CE device 104 initially generates a DHCPDISCOVER message that includes pseudowire configuration information (referred to as first pseudowire configuration information) embedded into the message. In an embodiment, the first pseudowire configuration information includes an indication that the CE device is capable of supporting pseudowires, an indication of what type or types of pseudowires the CE device desires, and an indication of what types of outer encapsulations the CE device is capable of supporting. Once generated, the DHCPDISCOVER message is communicated to the PE device.

The response of the PE device 102 to the DHCPDISCOVER message depends on whether the PE device is acting as a DHCP relay or as a DHCP proxy. In the case where the PE device is acting as a DHCP relay, the PE device has at least two options for handling the DHCPDISCOVER message. According to a first option, the DHCPDISCOVER message is forwarded to the DHCP server 110 as is. This option works well in the case where the DHCP server is compatible with the new extended use. According to a second option, the PE device extracts the first pseudowire configuration information from the DHCPDISCOVER message and stores the pseudowire configuration information for subsequent use. This option works well in cases where the DHCP server is not compatible with the new extended use. In either case, if the PE device is allowed to assign a pseudowire between the PE device and the CE device 104, then the PE device looks at the first pseudowire configuration information to see what types of pseudowires the CE device supports and/or desires. If the capabilities of the PE device are compatible with the capabilities and desires of the CE device, the PE device generates pseudowire configuration information (referred to as second pseudowire configuration information) necessary to establish the pseudowire. In an embodiment, the second pseudowire configuration information includes an indication of what type or types of pseudowires are to be configured, an indication of what types of outer encapsulations are to be used for the pseudowire(s), an indication of the labels to be used for the pseudowire(s), endpoint IP addresses, and control word information. The PE device can obtain pseudowire configuration information in a variety of ways including, but not limited to, explicit configuration, Remote Authentication Dial In User Name (RADIUS) calls, use of enhanced subscriber management, and/or matching a policy object in a local configuration.

While the PE device 102 is generating the second pseudowire configuration information, the DHCP server 110 generates a DHCPOFFER message in response to the DHCPDISCOVER message and transmits the DHCPOFFER message to the CE device 104 via the PE device. When the DHCPOFFER message arrives at the PE device, the second pseudowire configuration information is embedded into the DHCPOFFER message. Once the second pseudowire configuration information is embedded into the DHCPOFFER message, the message is forwarded to the CE device. Note, if the PE device acts as a DHCP proxy, then the DHCPOFFER message is generated at the PE device. Additionally, the second pseudowire configuration information can be generated at any time before the DHCPOFFER message arrives at the PE device.

Once the DHCPOFFER message is received at the CE device, the CE device generates a DHCPREQUEST message that includes pseudowire configuration information (referred to as third pseudowire configuration information). If for any reason, the CE device cannot accept the pseudowire as indicated by the second pseudowire configuration information, then the CE device goes into an error state. If the CE device can accept the pseudowire as indicated by the second pseudowire configuration information, then, in this embodiment, the CE device reiterates the assigned pseudowire configuration information in the DHCPREQUEST message. In an embodiment, the third pseudowire configuration information is the same as or similar to the second pseudowire configuration information and includes an indication of what type or types of pseudowires are to be configured, an indication of what types of outer encapsulations are to be used for the pseudowire(s), an indication of the labels to be used for the pseudowire(s), endpoint IP addresses, and control word information. Once the DHCPREQUEST message containing the third pseudowire configuration information is generated, the message is communicated to the PE device.

The response of the PE device 102 to the DHCPREQUEST message depends on whether the PE device is acting as a DHCP relay or as a DHCP proxy/server. In the case where the PE device is acting as a DHCP relay, the PE device has at least two options for handling the DHCPREQUEST message. As described above with reference to the DHCPDISCOVER message, the DHCPREQUEST message can be forwarded to the DHCP server 110 as is or the PE device can extract the third pseudowire configuration information from the DHCPREQUEST message and store the pseudowire configuration information for subsequent use. In either case, the PE device generates pseudowire configuration information (referred to as fourth pseudowire configuration information) in response to the third pseudowire configuration information. In an embodiment, the fourth pseudowire configuration information includes the same or similar information to the DHCPOFFER and DHCPREQUEST messages, for example, an indication of what type or types of pseudowires are to be configured, an indication of what types of outer encapsulations are to be used for the pseudowire(s), an indication of the labels to be used for the pseudowire(s), endpoint IP addresses, and control word information.

In the case where the PE device acts as a DHCP relay, the DHCP server 110 generates a DHCPACK message in response to the DHCPREQUEST message and transmits the DHCPACK message to the CE device 104 via the PE device. When the DHCPACK message arrives at the PE device, the fourth pseudowire configuration information is embedded into the DHCPACK message. Once the fourth pseudowire configuration information is embedded into the DHCPACK message, the message is forwarded to the CE device. Note, if the PE device acts as a DHCP proxy, then the DHCPACK message is generated at the PE device. The fourth pseudowire configuration information can be generated before or after the DHCPACK message arrives at the PE device. Once the CE device receives the DHCPACK message from the PE device, the pseudowire is available for use and traffic can be forwarded on the pseudowire.

In an embodiment, pseudowire state information is maintained at the PE device 102 for each pseudowire that is configured. For example, the pseudowire state information is maintained in persistent memory. In an embodiment, if the DHCP state is removed at the CE device (i.e., the IP address changes), then any corresponding pseudowires are terminated. In another embodiment, new pseudowires can be configured using the above-described protocol. Depending on the pseudowire type and encapsulation that is used, the same pseudowire configuration information could be used to reconfigure a pseudowire.

Figure 3:
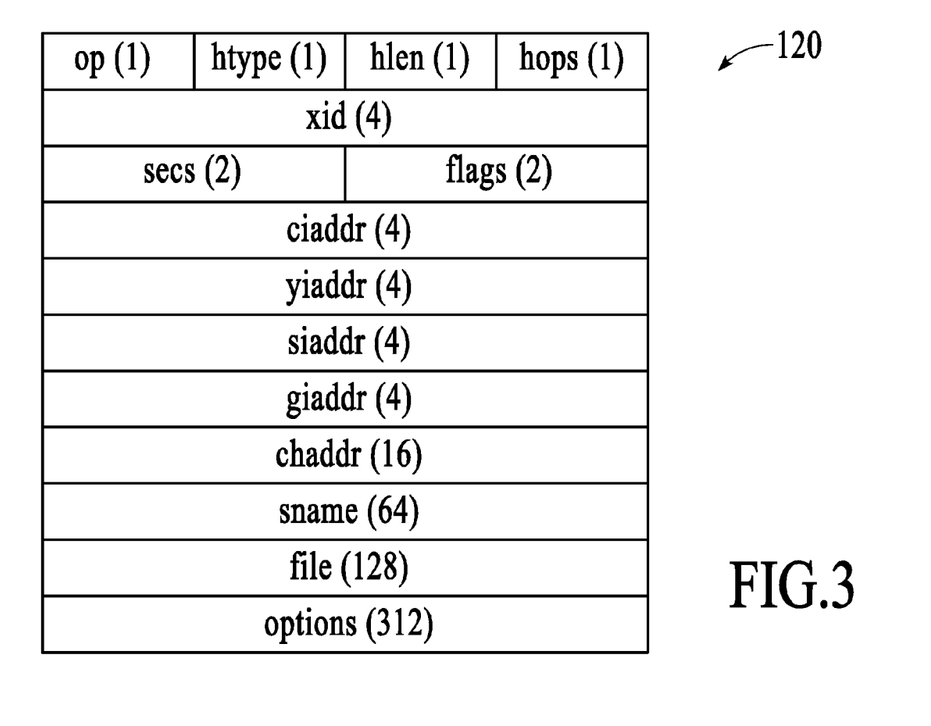
FIG. 3 depicts the message format of a DHCP message as specified by the DHCP protocol.

As described above, pseudowire configuration information is embedded into DHCP messages so that the pseudowire configuration information can be communicated between a CE device 104 and a PE device 102. Exemplary techniques for embedding pseudowire configuration information into DHCP messages are described below with reference to FIGS. 3 and 4. FIG. 3 depicts the message format of a DHCP message 120 as specified by the DHCP protocol. The message format includes the following fields, with the field length in bytes identified in parenthesis: operation code (1); hardware type (1); hardware address length (1); hops (1); transaction identifier (4); seconds elapsed (2); flags (2); client IP address (4); your IP address (4); server IP address (4); gateway IP address (4); client hardware address (16); server name (64); boot filename (128); and options (variable up to 312).

The options field enables DHCP messages to carry additional information. According to DHCP, the options field starts with a "magic cookie" value of "99.130.83.99" and consists of one or more subfields, each of which has a type-length-value (TLV) encoded substructure. In particular, specific options are identified by an 8-bit options tag field, an 8-bit length field, and a data field whose length is specified by the length field. DHCP messages are identified by option 53. A listing of widely accepted options is identified by the IETF in the document entitled "DHCP Options and BOOTP Vendor Extensions," RFC 2132, March 1997, which is incorporated by reference herein.

Figure 4:
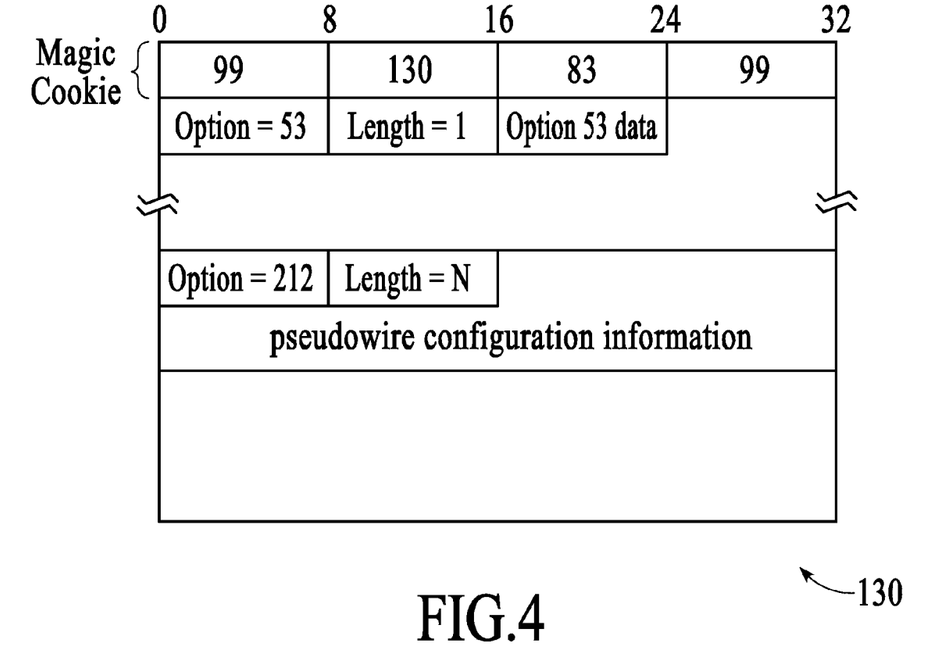
FIG. 4 depicts a portion of the options field of a DHCP message that includes a new option that is specific to carrying pseudowire configuration information.

In accordance with an embodiment of the invention, a new option is established for the communication of pseudowire configuration information. FIG. 4 depicts a portion of the options field 130 of a DHCP message that includes option 53 (which identifies the message as a DHCP message) and a new option (e.g., option 212) that is specific to carrying pseudowire configuration information 132. As depicted in FIG. 4, option 212 is a pseudowire-specific option, having a length N, which is specific for carrying pseudowire configuration information. In an alternative embodiment, multiple new options are established to carry different types of pseudowire configuration information. Although option 212 is cited as an example, another available option(s) can be designated to carry pseudowire configuration information.

Examples of pseudowire-specific option encoding is now described for the case in which pseudowires are network assigned, e.g., not assigned by the client. As described above, a DHCPDISCOVER message is sent from a CE device 104 to a PE device 102 with pseudowire configuration information embedded into the message. In this example, the pseudowire configuration information is embedded into the DHCP message by adding a pseudowire option identified as "DHCP_PW OPTION," e.g., using option 212. Within the DHCPDISCOVER message, the DHCP_PW OPTION is formatted as follows:

Code|Length|

Subcode [network provided pseudowires a.k.a. "pseudowire me!"]|Length|

Data

[supported outer encapsulations: MPLS, GRE]

[supported pseudowire types: ATM, TDM, Ethernet]

[number of supported pseudowires: 10]

When a DHCPDISCOVER message encoded with the above information is received by a PE device 102, the PE device learns the types of outer encapsulations and pseudowires that are supported by the CE device 104. In this example, the advertised capabilities indicate that the CE device can support either MPLS or Generic Routing Encapsulation (GRE) for outer encapsulation and ATM, TDM, or Ethernet pseudowires. If there is a mismatch between what the CE device can support and what the PE device (acting as the DHCP relay or DHCP server) wishes to configure, an error can be raised. In this example, there in no such mismatch and the configuration moves forward.

The PE device 102 is configured to parse the incoming DHCPDISCOVER message. Taking into consideration all of the information that is known about the CE device 104 (e.g., based on the interface, DHCP, RADIUS, or other configuration methods), the PE device assigns the following pseudowires: 1 ATM pseudowire over MPLS, 1 TDM pseudowire over MPLS, and 1 Ethernet pseudowire over GRE. This information is embedded into a DHCPOFFER message by adding the pseudowire option identified again as "DHCP_PW OPTION," e.g., using option 212. Within the DHCPOFFER message, the DHCP_PW OPTION is formatted as follows:

Code | Length |
Subcode [assigned pseudowire] #1 | Length |
Data
[outer encapsulation: MPLS; label from network: 1042; label to network: 121] [control word required: 1]
[pseudowire type: ATM]
[pseudowire info length]
[group id: 0]
pseudowire ID: 441]
[interface parameters: 0]
Subcode [assigned pseudowire] #2 | Length |
Data
[outer encapsulation: MPLS; label from network: 1055; label to network: 106] [control word required: 1]
[pseudowire type: TDM]
[pseudowire info length]
[group id: 0]
[pseudowire ID: 442]
[interface parameters: 0]
Subcode [assigned pseudowire] #3 | Length |
Data -continued

```
[outer encapsulation: GRE; destination IP: 10.12.34.55] # alternately
   dest IP can be determined from default gateway,
   origin IP is the address assigned in the DHCP message]
[control word required: 0]
[pseudowire type: Ethernet]
[pseudowire info length]
[group id: 0]
[pseudowire ID: 443]
[interface parameters: 0]
```

In this embodiment, the DHCPREQUEST and DHCPACK messages also carry pseudowire configuration information using the DHCP_PW OPTION, e.g., option 212. In an embodiment, the DHCPREQUEST and DHCPACK messages carry pseudowire configuration information that is the same as or similar to the pseudowire configuration information carried in the DHCPOFFER message.

Although an example of pseudowire option encoding is described above, other encoding techniques and/or arrangements can be used. Further, other combinations of pseudowire configuration information can be included in the DHCP messages. In an embodiment, the pseudowire configuration information includes information that is encoded similar to the encoding of Forwarding Equivalency Class (FEC) parameters, which are encoded using LDP.

Although one example of how to embed pseudowire configuration information into the DHCP messages is provided, pseudowire configuration information can be embedded into DHCP messages in other ways. For example, in accordance with another embodiment of the invention, pseudowire configuration information is embedded into DHCP messages by adding the pseudowire configuration information to data carried in an existing option. Pseudowire configuration information can be added to an existing option by, for example, "option overloading." Option overloading involves utilizing the server name and boot filename fields of a DHCP message to carry additional information. Option overloading is triggered by option 52, which causes the server name and boot filename fields to be read the same way as the options field after all of the options in the options field are read.

In the above-described examples, the pseudowire configuration is primarily controlled by the PE device 102. That is, the PE device determines what pseudowires will be configured and what labels will be used. In an alternative embodiment, the CE device 104 exerts more control over the pseudowire configuration process. For example, the CE device specifies the particular pseudowires that it wants and/or the particular labels that it wants used. The CE device can specify certain pseudowire information by embedding the information into one of the DHCP messages, e.g., the DHCPDISCOVER and/or DHCPREQUEST messages.

Figure 5:
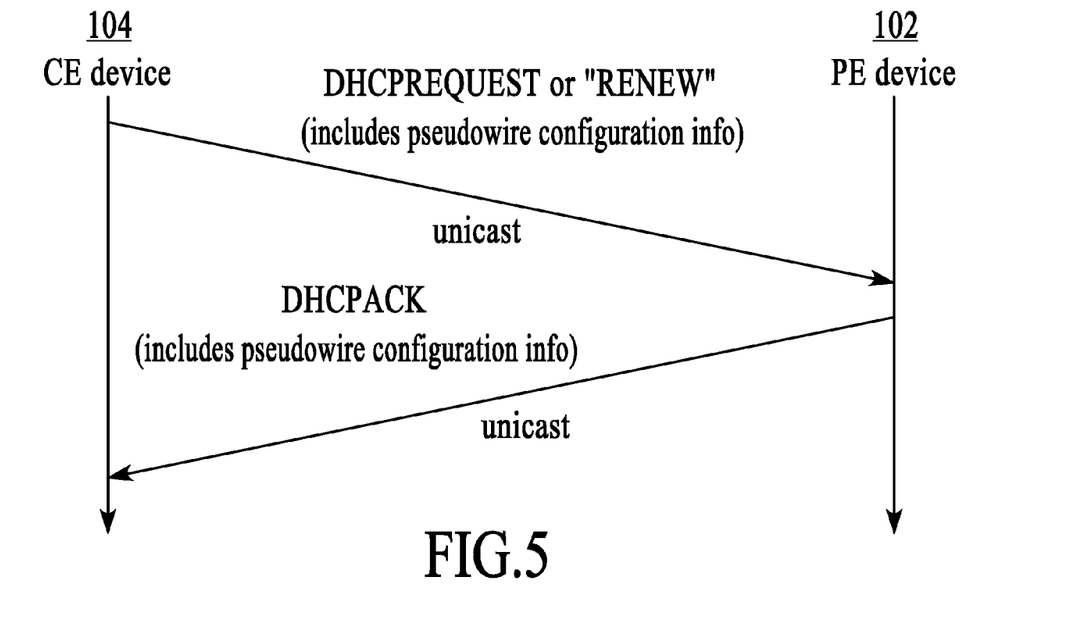
FIG. 5 depicts DHCP message exchanges in another technique for configuring a pseudowire that utilizes the DHCP protocol.

In the process described with reference to FIG. 2, pseudowire configuration is accomplished using messages that are associated with the initial allocation of a new IP address to a client. In another embodiment, DHCP messages that are used for lease renewal can be used to configure a pseudowire. For example, DHCP specifies that a unicast version of the DHCPREQUEST message can be generated by the client and sent to the DHCP server to renew a lease on an IP address. This message, which is associated with a client's RENEWING state, is also referred to as a "DHCPRENEW," "RENEW," "DHCPRENEWAL," or "RENEWAL" message. In accordance with an embodiment of the invention, a DHCPRENEW message is embedded with pseudowire configuration information, for example, any of the pseudowire configuration information described above. Referring to FIG. 5, the CE device 104 generates a DHCPRENEW message, which includes embedded pseudowire configuration information, and forwards the message to the PE device 102. As described above, the PE device can act as a DHCP relay or a DHCP proxy/server. In either case and in response to the DHCPRENEW message, the PE device generates pseudowire configuration information that is embedded into a DHCPACK message. The DHCPACK message is provided to the CE device and the exchange of pseudowire configuration information between the CE device and PE device is used to configure a pseudowire between the CE device and the PE device. DHCPRENEW messaging can be used to communicate various types of pseudowire configuration and maintenance information between the CE device and the PE device.

Figure 6:
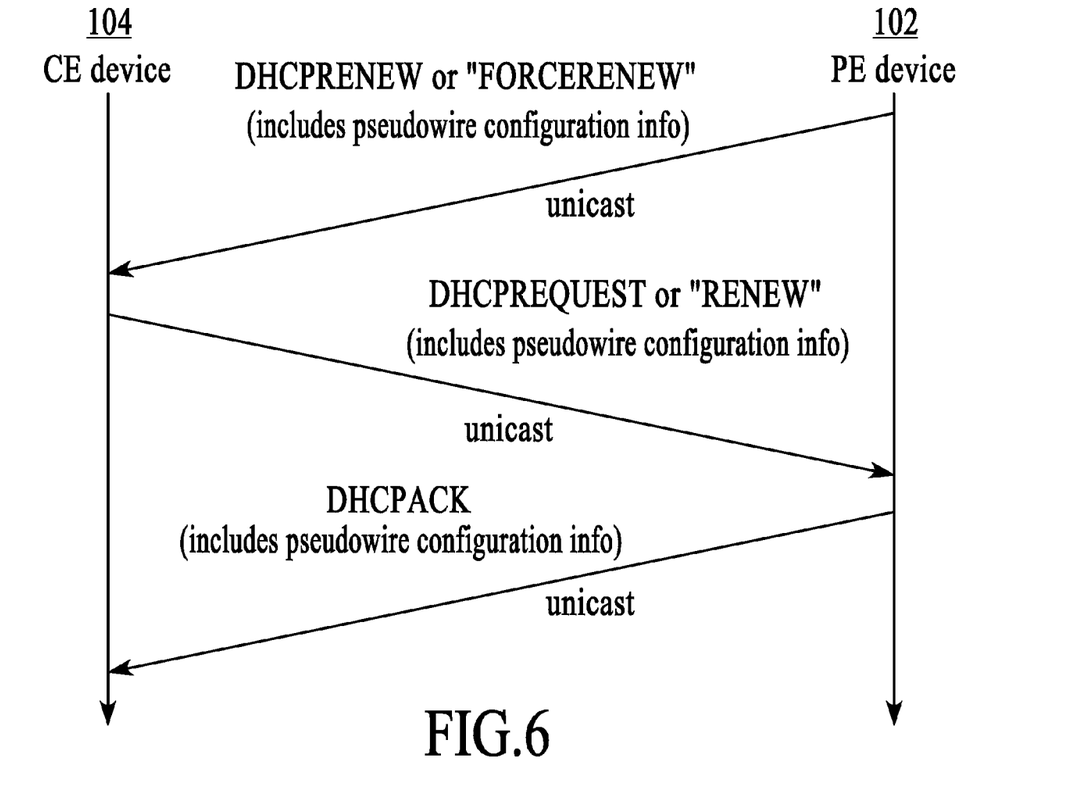
FIG. 6 depicts DHCP message exchanges in another technique for configuring a pseudowire that utilizes the DHCP protocol.

An extension to DHCP is described in the IETF document entitled "DHCP reconfiguration extension," RFC 3203, December 2001, which is incorporated by reference herein. The extension defines a unicast message, referred to as a "DHCPFORCERENEW" or "FORCERENEW" message, which is used to force the client into the RENEWING state. In accordance with an embodiment of the invention, a DHCPFORCERENEW message can be used to initiate pseudowire configuration from the PE device side of the network. FIG. 6 illustrates an exemplary use of a DHCPFORCERENEW message to initiate pseudowire configuration from the PE device. Specifically, pseudowire configuration information is generated by the PE device and embedded into a DHCPFORCERENEW message. For example, the pseudowire configuration information includes an indication that the PE device desires to establish a pseudowire to the CE device. The DHCPFORCERENEW message can be generated by the PE device or by a separate DHCP server depending on whether the PE device acts as a DHCP relay or a DHCP proxy/server. Once the DHCPFORCERENEW message is received by the client, the client is pushed into the RENEWING state and the process continues as described above with reference to FIG. 5, e.g., the CE device generates a DHCPRENEW message.

As described above, the technique for configuring pseudowires can be applied to multiple different types of pseudowires including, for example, TDM, ATM, Frame Relay, and Ethernet. Further, the technique can be applied to multiple different types of outer encapsulations including, for example, IPinIP, IPinGRE, IPinL2TP, and MPLS. In the case of the IP-based encapsulations, the assigned DHCP address can be set up as the other end of the tunnel. In the case of MPLS, the PE can provide a set of MPLS labels to use.

In an embodiment, authentication is handled through the normal DHCP and 802.1x mechanisms. In an embodiment, conventional pseudowire refresh/status mechanisms can be used to check if a link between a CE device and a PE device is up. Additionally, link failures can be handled using normal DHCP messages.

Figure 7:
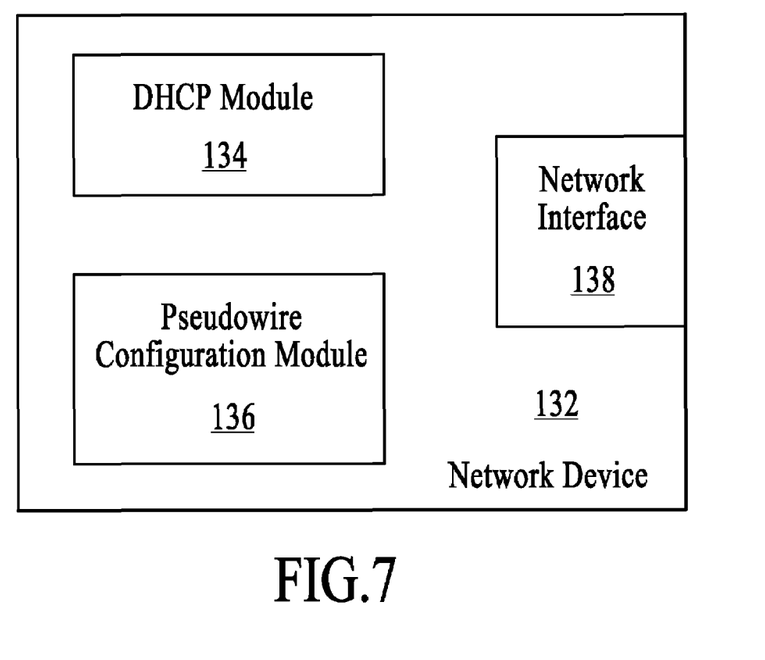
FIG. 7 depicts an embodiment of a network device that is configured to act as either a CE device or a PE device.

FIG. 7 depicts an embodiment of a network device 132 that is configured to act as either the CE device 104 or the PE device 102 in the configuration processes described above. The network device includes a DHCP module 134, a pseudowire configuration module 136, and a network interface 138. When the network device acts as the CE device, the DHCP module generates the DHCPDISCOVER and the DHCPREQUEST messages and the pseudowire configuration module generates the first and third pseudowire configuration information. When the network device acts as the PE device, the DHCP module performs DHCP relay and/or DHCP proxy/server duties (e.g., relaying or generating the DHCPOFFER and DHCPACK messages) and generates the second and fourth pseudowire configuration information.

DHCP messages are communicated to other network devices via the network interface. In an embodiment, the DHCP and pseudowire configuration modules are embodied as software code that is stored on a storage media, although the modules may be embodied as any combination of hardware, software, and/or firmware.

Although the network devices in FIG. 1 are described as CE devices 104 and PE devices 102, these network devices do not have to be "customer" and "provider" devices. For example, these devices can be installed and/or operated by the same entity or different entities. The concepts of CE devices and PE devices are commonly used in the context of tunnels, tunneling, pseudowires, and label switching.

Figure 8:
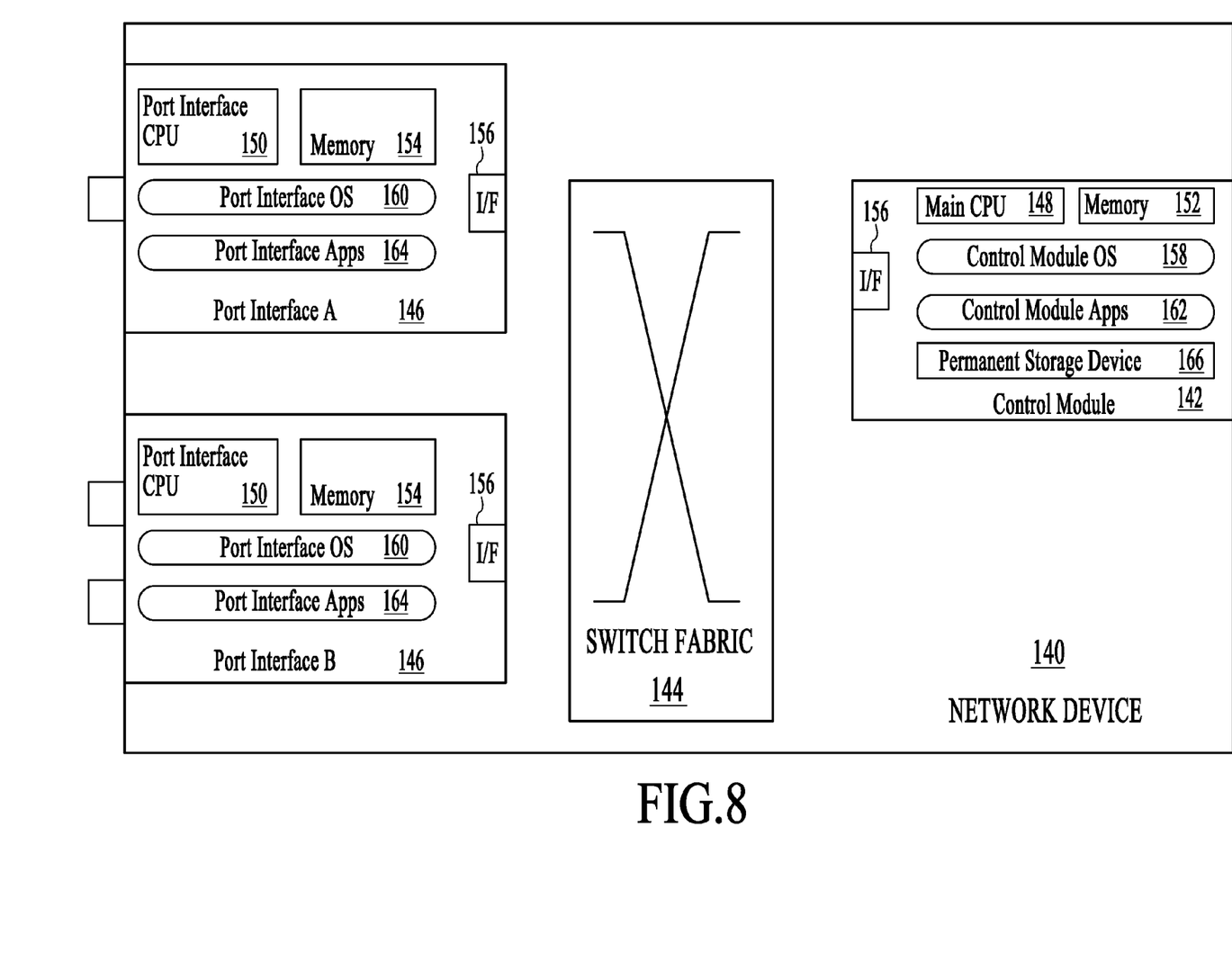
FIG. 8 depicts an exemplary network switching and/or routing device that can function as a PE device in FIG. 1.

FIG. 8 depicts an exemplary network switching and/or routing device (referred to herein as a network node 140) that can function as a PE device 102 in the network 100 of FIG. 1. The network node includes a control module 142, a switch fabric 144, and two port interface modules 146 (port interfaces A and B). The network node is described as having a distributed architecture because the control module and the two port interfaces each run their own independent operating systems.

The network node 140 handles traffic in discrete segments, often referred to as datagrams. In an embodiment, the network node is an Ethernet switch/router that forwards traffic within the network node using Layer 2 (L2), Layer 3 (L3), and/or Layer 4 (L4) header information, where the network "Layers" are described in the Open System Interconnection (OSI) model as defined by the International Standardization Organization (ISO). The network node may include port interfaces that support network protocols such as Ethernet, asynchronous transfer mode (ATM), synchronous optical network (SONET), and Frame Relay. Although an Ethernet-based switch/router is described, the disclosed techniques for configuring pseudowires can be applied to other types of network devices.

Referring to FIG. 8, the control module 142 of the network node 140 supports various functions such as network management functions and protocol implementation functions. Example functions that are performed by the control module include implementing configuration commands, providing timing control, distributing operating system and application software code, programming hardware tables, providing system information, supporting a user interface, managing hardware changes, and bus management. The switch fabric 144 provides datapaths between the control module and the port interfaces 146 (e.g., control module to port interface datapaths and port interface to port interface datapaths). The switch fabric may include, for example, shared memory, shared bus, and crosspoint matrices. The port interfaces perform functions such as receiving traffic into the network node, buffering traffic, making forwarding decisions, and transmitting traffic from the network node. The port interfaces include one or more ports that support connections to other network nodes.

The control module 142 and port interfaces 146 are independent computer systems that include their own central processing unit (CPU) 148 and 150, memory 152 and 154, interface (I/F) 156, operating system 158 and 160, and applications 162 and 164. The CPU within each independent computer system may include a multifunction processor and/or an application-specific processor. Examples of processors include the PowerPC™ family of processors by IBM and the x86 family of processors by Intel. The memory within the control module may include read only memory (ROM), flash memory, and RAM. The control module includes a large capacity permanent storage device 166 such as a hard disk drive. Because the port interfaces do not include a permanent storage device similar to the control module, their storage capacity is much less than that of the control module.

The interfaces 156 of the control module 142 and port interfaces 146 enable the control module and port interfaces to communicate with each other. In an embodiment, the control module and port interfaces communicate with each other over a backplane (not shown).

The operating systems 158 and 160 of the control module 142 and port interfaces 146 provide a bridge between the CPU, memory, and applications of the respective modules. Examples of operating systems that are used in network nodes with distributed architectures include well-known operating systems such as NetBSD, Linux, and vxWORKS. Although not shown, the CPUs and operating systems may be supported by other hardware (e.g., content addressable memory (CAM) and application-specific integrated circuits (ASICs)).

The applications 162 and 164 that reside on the independent computer systems (i.e., the control module 142 and port interfaces 146) are software-based applications that perform various tasks required of the network node 140. Example applications that are loaded onto the independent computer systems of the network node include, but are not limited to, L2 protocols, such as L2 Learning, virtual local area network (VLAN) management, spanning tree protocol (STP), and link aggregation control protocol (LACP) and L3 protocols such as DHCP, LDP, RSVP, open shortest path first (OSPF), border gateway protocol (BGP), intermediate system-to-intermediate system (ISIS), and multiprotocol label switching (MPLS). Although the CPUs 148 and 150, memory 152 and 154, operating systems 158 and 160, and applications 162 and 164 of each module are depicted in FIG. 8 as separate functional units for description purposes, these functional units are operatively and functionally integrated as is known in the field. Additionally, although some examples of CPUs, memory, operating systems, and applications are provided, these examples in no way are meant to be exhaustive lists. In an embodiment, the network node of FIG. 8 is a chassis-based network node in which the control module, switch fabric, and port interfaces are individually removable modules. Although FIG. 8 provides one example of a PE device, the PE device can include other configurations. The process for configuring pseudowires should not be limited to a particular configuration of a PE device.

While the above-described techniques are described in the general context of network devices such as Ethernet-based switches, bridges, etc., those skilled in the art will recognize that the above-described techniques may be implemented in software, hardware, firmware or any combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine readable instructions executable by a digital data processor to perform the method in accordance with an embodiment of the present invention. The computer readable media may comprise, for example, RAM (not shown) contained within the PE devices. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards, or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

In an embodiment, the network node 140 of FIG. 8 acts as the PE device 102 while the CE device 104 is a device that does not include all of the switching/routing capabilities of the network node of FIG. 8. As described above, the CE device may be, for example, an end station in a cellular network (e.g., BTS/NodeB).

Figure 9:
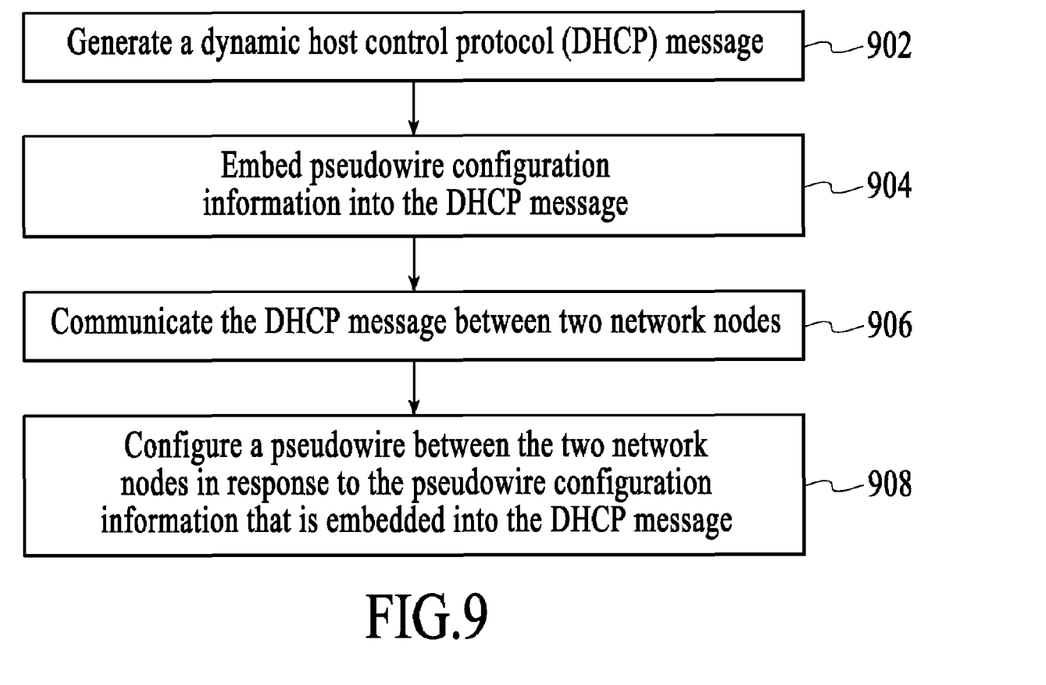
FIG. 9 is a process flow diagram of a method for configuring a pseudowire in accordance with an embodiment of the invention.

FIG. 9 is a process flow diagram of a method for configuring a pseudowire in accordance with an embodiment of the invention. At block 902, a DHCP message is generated. At block 904, pseudowire configuration information is embedded into the DHCP message. At block 906, the DHCP message is communicated between two network nodes. At block 908, a pseudowire is configured between the two network nodes in response to the pseudowire configuration information that is embedded into the DHCP message.

Figure 10:
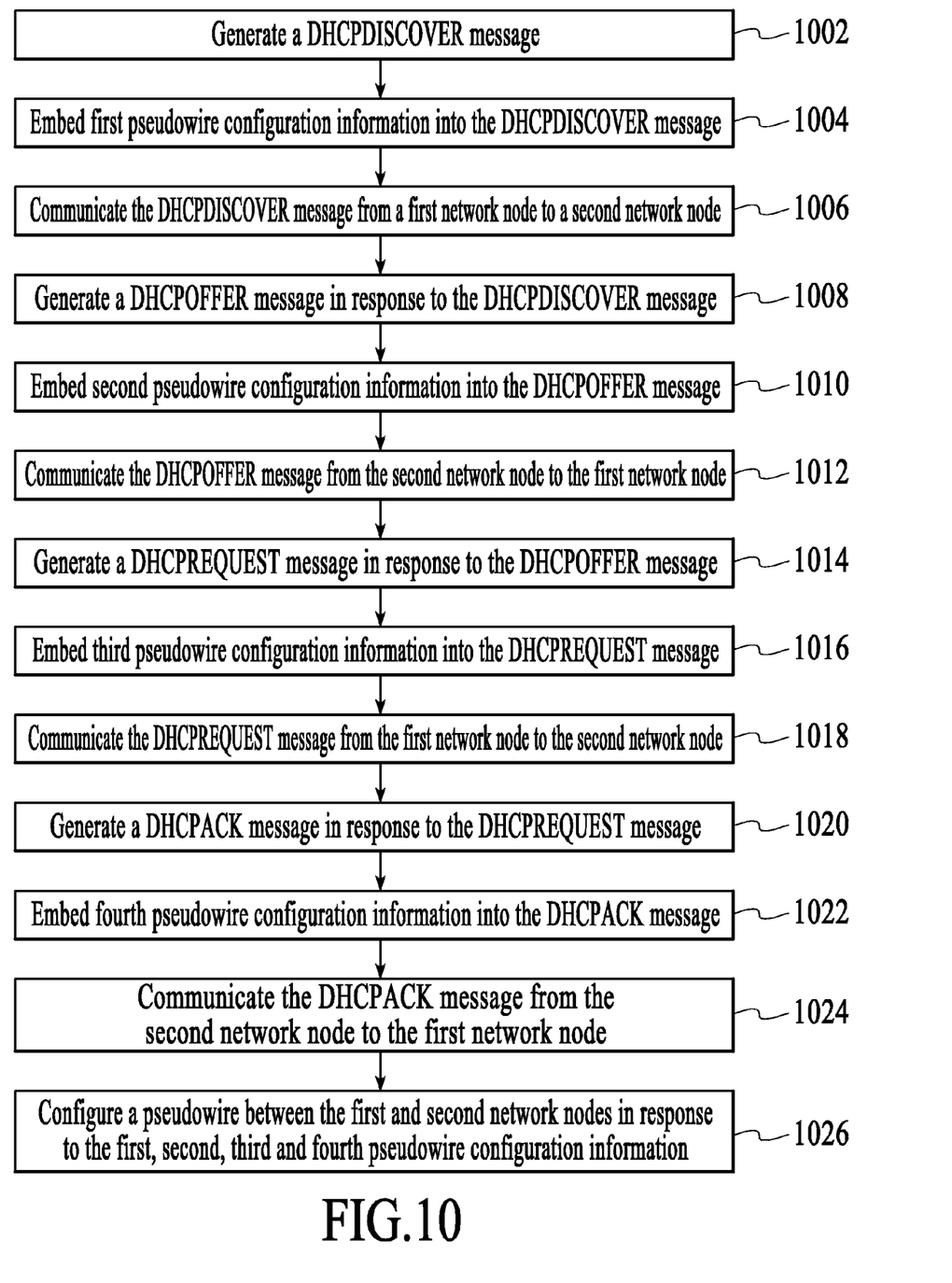
FIG. 10 is a process flow diagram of another method for configuring a pseudowire in accordance with an embodiment of the invention.

FIG. 10 is a process flow diagram of another method for configuring a pseudowire in accordance with an embodiment of the invention. At block 1002, a DHCPDISCOVER message is generated. At block 1004, first pseudowire configuration information is embedded into the DHCPDISCOVER message. At block 1006, the DHCPDISCOVER message is communicated from a first network node to a second network node. At block 1008, a DHCPOFFER message is generated in response to the DHCPDISCOVER message. At block 1010, second pseudowire configuration information is embedded into the DHCPOFFER message. At block 1012, the DHCPOFFER message is communicated from the second network node to the first network node. At block 1014, a DHCPREQUEST message is generated in response to the DHCPOFFER message. At block 1016, third pseudowire configuration information is embedded into the DHCPREQUEST message. At block 1018, the DHCPREQUEST message is communicated from the first network node to the second network node. At block 1020, a DHCPACK message is generated in response to the DHCPREQUEST message. At block 1022, fourth pseudowire configuration information is embedded into the DHCPACK message. At block 1024, the DHCPACK message is communicated from the second network node to the first network node. At block 1026, a pseudowire is configured between the first and second network nodes in response to the first, second, third, and fourth pseudowire configuration information.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. In still another embodiment, a subset of the operations may be sufficient to configure a pseudowire.

Although specific embodiments of the invention have been described and illustrated, the invention is not to be limited to the specific forms or arrangements of parts as described and illustrated herein. The invention is limited only by the claims.

What is claimed is:

1. A method for configuring a pseudowire, the method comprising:

at a dynamic host control protocol (DHCP) module of a first network node, generating a DHCP message;

at a pseudowire configuration module of the first network node, generating pseudowire configuration information;

embedding the pseudowire configuration information into the DHCP message;

communicating the DHCP message between two network nodes, the first network node being one of the two network nodes; and configuring a pseudowire between the two network nodes in response to the pseudowire configuration information that is embedded into the DHCP message.

2. The method of claim 1 wherein the pseudowire configuration information comprises a pseudowire label.

3. The method of claim 1 wherein generating a DHCP message comprises generating a DHCPDISCOVER message and wherein embedding pseudowire configuration information into the DHCP message comprises embedding pseudowire configuration information into the DHCPDISCOVER message.

4. The method of claim 3 wherein communicating the DHCP message comprises transmitting the DHCPDISCOVER message from a customer edge (CE) device to a provider edge (PE) device.

5. The method of claim 4 wherein the pseudowire configuration information comprises an indication of pseudowire capabilities of the CE device.

6. The method of claim 4 wherein the pseudowire configuration information comprises an indication of types of pseudowires needed by the CE device.

7. The method of claim 4 wherein the pseudowire configuration information comprises an indication of types of outer encapsulations that the CE device is capable of supporting.

8. The method of claim 1 wherein generating a DHCP message comprises generating a DHCPOFFER message and wherein embedding pseudowire configuration information into the DHCP message comprises embedding pseudowire configuration information into the DHCPOFFER message.

9. The method of claim 8 wherein communicating the DHCP message comprises transmitting the offer message from a PE device to a CE device.

10. The method of claim 8 wherein the pseudowire configuration information comprises pseudowire labels.

11. The method of claim 8 wherein the pseudowire configuration information comprises an indication of the type of outer encapsulation for the pseudowire.

12. The method of claim 1 wherein generating a DHCP message comprises generating a DHCPREQUEST message and wherein embedding pseudowire configuration information into the DHCP message comprises embedding pseudowire configuration information into the DHCPREQUEST message.

13. The method of claim 12 further comprising generating a DHCPFORCERENEW message and wherein the DHCPREQUEST message is generated in response to the DHCPFORCERENEW message.

14. The method of claim 1 wherein generating a DHCP message comprises generating a DHCPACK message and wherein embedding pseudowire configuration information into the DHCP message comprises embedding pseudowire configuration information into the DHCPACK message.

15. The method of claim 1 wherein embedding pseudowire configuration information into the DHCP message comprises identifying a pseudowire-specific option.

16. The method of claim 1 wherein embedding pseudowire configuration information into the DHCP message comprises overloading an existing option.

17. A method for configuring a pseudowire, the method comprising:

at a dynamic host configuration protocol (DHCP) module of a first network node, generating a DHCP discover (DHCPDISCOVER) message;

at a pseudowire configuration module of the first network node, generating first pseudowire configuration information;

embedding the first pseudowire configuration information into the DHCPDISCOVER message;

communicating the DHCPDISCOVER message from the first network node to a second network node;

at a DHCP module of the second network node, generating a DHCP offer (DHCPOFFER) message in response to the DHCPDISCOVER message;

at a pseudowire configuration module of the second network node, generating second pseudowire configuration information;

embedding the second pseudowire configuration information into the DHCPOFFER message;

communicating the DHCPOFFER message from the second network node to the first network node;

at the DHCP module of the first network node, generating a DHCP request (DHCPREQUEST) message in response to the DHCPOFFER message;

at the pseudowire configuration module of the first network node, generating third pseudowire configuration information;

embedding the third pseudowire configuration information into the DHCPREQUEST message;

communicating the DHCPREQUEST message from the first network node to the second network node;

at the DHCP module of the second network node, generating a DHCP acknowledge (DHCPACK) message in response to the DHCPREQUEST message;

at the pseudowire configuration module of the second network node, generating fourth pseudowire configuration information;

embedding the fourth pseudowire configuration information into the DHCPACK message;

communicating the DHCPACK message from the second network node to the first network node; and     configuring a pseudowire between the first and second network nodes in response to the first, second, third, and fourth pseudowire configuration information.

18. The method of claim 17 wherein the first pseudowire configuration information comprises pseudowire capability information and wherein the second pseudowire configuration information comprises a pseudowire label.

19. A network device that is capable of supporting a pseudowire between the network device and another network device, the network device comprising:

a dynamic host configuration protocol (DHCP) module configured to generate DHCP messages; and     a pseudowire configuration module configured to:

embed pseudowire configuration information into a DHCP message that is generated by the DHCP module; and         configure a pseudowire between the network device and another network device in response to pseudowire configuration information that is extracted from a DHCP message received by the DHCP module.

20. The network device of claim 19 wherein the network device acts as a customer edge (CE) device and wherein the DHCP module is configured to generate a DHCPDISCOVER message and the pseudowire configuration module is configured to embed pseudowire capability information into the DHCPDISCOVER message.

21. The network device of claim 19 wherein the network device acts as a customer edge (CE) device and wherein the DHCP module is configured to generate a DHCPREQUEST message and the pseudowire configuration module is configured to embed pseudowire configuration information into the DHCPREQUEST message.

22. The network device of claim 19 wherein the network device acts as a provider edge (PE) device and wherein the DHCP module is configured to generate a DHCPOFFER message and the pseudowire configuration module is configured to embed pseudowire configuration information into the DHCPOFFER message.

23. The network device of claim 19 wherein the pseudowire configuration information comprises one of a pseudowire label, an endpoint IP address, a pseudowire type, and control word information.

\* \* \* \* \*